US012691918B2

(12) United States Patent
Goodell et al.

(10) Patent No.: US 12,691,918 B2
(45) Date of Patent: Jul. 28, 2026

(54) COUPLING SYSTEMS AND METHODS FOR CARTS

(71) Applicant: THE BOEING COMPANY, Chicago, IL (US)

(72) Inventors: Amy Elizabeth Goodell, Seattle, WA (US); Wade Bruce Stoelting, Arlington, WA (US)

(73) Assignee: The Boeing Company, Arlington, VA (US)

( * ) Notice: Subject to any disclaimer, the term of this patent is extended or adjusted under 35 U.S.C. 154(b) by 426 days.

(21) Appl. No.: 17/896,194

(22) Filed: Aug. 26, 2022

(65) Prior Publication Data

US 2023/0139044 A1 May 4, 2023

Related U.S. Application Data

(60) Provisional application No. 63/275,003, filed on Nov. 3, 2021.

(51) Int. Cl.
B62B 3/02 (2006.01)
B62B 3/00 (2006.01)
B64D 11/00 (2006.01)

(52) U.S. Cl.
CPC ............ B62B 3/02 (2013.01); B64D 11/0007 (2013.01); B62B 3/002 (2013.01)

(58) Field of Classification Search
CPC .. B62B 3/02; B62B 3/002; B62B 3/18; B62B 5/0083; B62B 1/14; B64D 11/0007
USPC .......................................................... 280/47
See application file for complete search history.

(56) References Cited

U.S. PATENT DOCUMENTS 9,084,498 B2 * 7/2015 Maddux
12,128,941 B2 * 10/2024 Lange

OTHER PUBLICATIONS

Webpage showing a coupler for food carts, including a spec sheet giving more information about the coupler and a publication date. (Year: 2009).*

* cited by examiner

*Primary Examiner* — James A Shriver, II
*Assistant Examiner* — Nicholas R. Kandas
(74) *Attorney, Agent, or Firm* — Joseph M. Butscher; Carroll, Hoette & Butscher, LLC

(57) ABSTRACT

A coupling system and method for connecting a first cart to a second cart includes a first stabilizing arm configured to span between the first cart and the second cart on a first side, and a second stabilizing arm configured to span between the first cart and the second on a second side opposite from the first side.

20 Claims, 7 Drawing Sheets

| | |
|---|---|
| Move a first cart into close proximity to a second cart | 300 |
| Dispose a coupling system over the first cart and the second cart | 302 |
| Connect portions of the coupling system to portions of the first cart and the second cart | 304 |

COUPLING SYSTEMS AND METHODS FOR CARTS

CROSS-REFERENCE TO RELATED APPLICATION

This application claims priority to U.S. Patent Application No. 63/275,003, filed Nov. 3, 2021, which is hereby incorporated by reference in its entirety.

FIELD OF THE DISCLOSURE

Examples of the present disclosure generally relate to coupling systems and methods for carts, such as used in internal cabins of vehicles.

BACKGROUND OF THE DISCLOSURE

Commercial aircraft are used to transport passengers between various locations. Catering services aboard commercial aircraft utilize full-size and half-size galley carts. The carts are typically stowed within galleys. Flight attendants maneuver the carts into and through aisles of an internal cabin of the aircraft to deliver food items and beverages to seated passengers. A half-size cart has a wheelbase length that is approximately half that of a full-size cart. The carts (both half-size and full-size) provide various operational functions, such as storing meals, beverages, waste, sales of goods, and the like.

Typically, the carts are maneuvered by pushing on a handle at the top of the cart. However, half-size carts may be less stable than full size a full-size carts due to their reduced wheelbase.

Carts, such as meal carts, beverage carts, waste carts, and the like, are individually maneuvered into and through one or more aisles of an internal cabin. Consequently, the workload of flight attendants increases due to the multiple times they serve passengers via the different carts. Moreover, the potential instability of half-size carts may cause certain entities to prefer not to use them, despite that they can be more versatile and require less stowage space.

SUMMARY OF THE DISCLOSURE

A need exists for a system and method of reducing workload of flight attendants during a flight. Further, a need exists for increasing stability of certain carts, such as half-size carts.

With those needs in mind, certain examples of the present disclosure provide a coupling system for removably connecting a first cart to a second cart. The coupling system includes a first stabilizing arm configured to span between the first cart and the second cart on a first side, and a second stabilizing arm configured to span between the first cart and the second on a second side opposite from the first side.

In at least one example, the coupling system also includes a cart cross member configured to extend proximate to ends of the first cart and the second cart. The cart cross member connects the first stabilizing arm to the second stabilizing arm. In at least one example, the cart cross member includes a spanner bar connected to the first stabilizing arm and the second stabilizing arm, and one or more spacer tabs downwardly extending from the spanner bar.

In at least one example, each of the first stabilizing arm and the second stabilizing arm includes one or more flanges that extend downwardly to trap an upper side edge of each of the first cart and the second cart. In at least one example, the one or more flanges include one or more first flanges downwardly extending from a first side of a ledge, and one or more second flanges downwardly extending from a second side of the ledge, wherein the second side is opposite from the first side. In at least one example, the one or more first flanges have a first size, and wherein the one or more second flanges have a second size that differs from the first size. In at least one example, each of the first stabilizing arm and the second stabilizing arm includes a central notch that traps upper edges of the first cart and the second cart.

In at least one example, a basket connects the first stabilizing arm to the second stabilizing arm. In at least one example, a countertop connects the first stabilizing arm to the second stabilizing arm.

Each of the first cart and the second cart can be a half-size cart.

Certain examples of the present disclosure provide a method for removably connecting a first cart to a second cart. The method includes connecting a first cart to a second cart with a first stabilizing arm spanning between the first cart and the second cart on a first side, and a second stabilizing arm spanning between the first cart and the second on a second side opposite from the first side.

Certain examples of the present disclosure provide a system including a first cart, a second cart, and a coupling system that removably connects the first cart to the second cart, as described herein.

DETAILED DESCRIPTION OF THE DISCLOSURE

Figure 1:
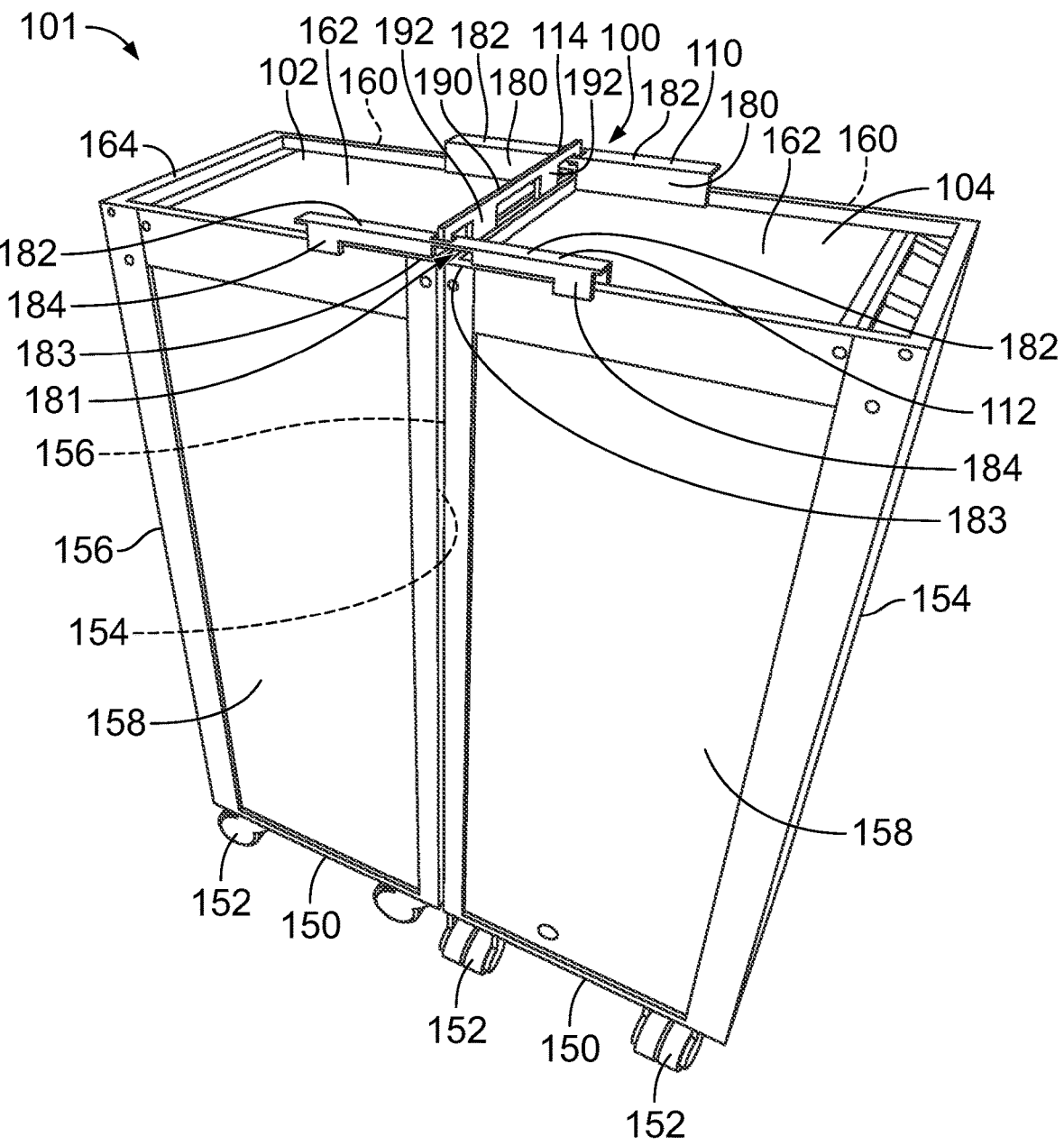
FIG. 1 illustrates a perspective view from a first side of a coupling system connecting a first cart to a second cart, according to an example of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain examples of the present disclosure provide a coupling system for carts, such as may be used in internal cabins of vehicles (for example, commercial aircraft). The coupling system is configured to tie or otherwise couple carts together. An individual, such as a flight attendant, can link different carts (such as meal/beverage/waste carts) together in combination to better serve seated passengers, and reduce passes through the internal cabin. In at least one example, the coupling system combines, links, or otherwise couples two half-size carts, thereby increasing stability. Examples of the present disclosure provide coupling systems that allow a flight attendant to serve additional seats with meals, beverage and/or waste collection in a single pass.

Certain examples of the present disclosure provide a coupling system (for example, a cart connector) for galley carts within an internal cabin of a vehicle. The coupling system includes features for connecting and stabilizing multiple carts together for transport. The coupling system includes a pair of stabilizing arms, which can be connected together by a cart cross member extending between and relative to the carts. The stabilizing arms extend from opposing ends of the cart cross member. Each stabilizing arm includes flanges that extend downwardly to trap an upper side edge of the joined carts. Each stabilizing arm includes a central notch that traps upper lateral edges of the joined carts. Accordingly, the coupling system can removably and temporarily couple two carts together for transport. A plurality of connectors can be used to link together three or more carts in a linear array of carts for transport.

Examples of the present disclosure provide the ability to combine a meal cart with a second meal cart, or beverage cart or waste cart. The combination of carts provides increased capability while reducing workload for flight attendants. Combined half size carts for transport down an aisle of an internal cabin is equivalent to capacity of one full size cart, yet more versatile, allowing different types of service to be completed at one time in a safe manner.

Certain examples of the present disclosure provide a coupling system for connecting a first cart to a second cart. The coupling system includes a first stabilizing arm configured to span between the first cart and the second cart on a first side, and a second stabilizing arm configured to span between the first cart and the second on a second side opposite from the first side. In at least one example, a cart cross member is configured to extend between the first cart and the second cart. The cart cross member connects the first stabilizing arm to the second stabilizing arm. In at least one example, each of the first stabilizing arm and the second stabilizing arm includes one or more flanges that extend downwardly to trap an upper side edge of the first cart and the second cart. In at least one further example, each of the first stabilizing arm and the second stabilizing arm includes a central notch that traps upper edges of the first cart and the second cart. In at least one example, a basket connects the first stabilizing arm to the second stabilizing arm. In at least one example, a countertop connects the first stabilizing arm to the second stabilizing arm.

Figure 2:
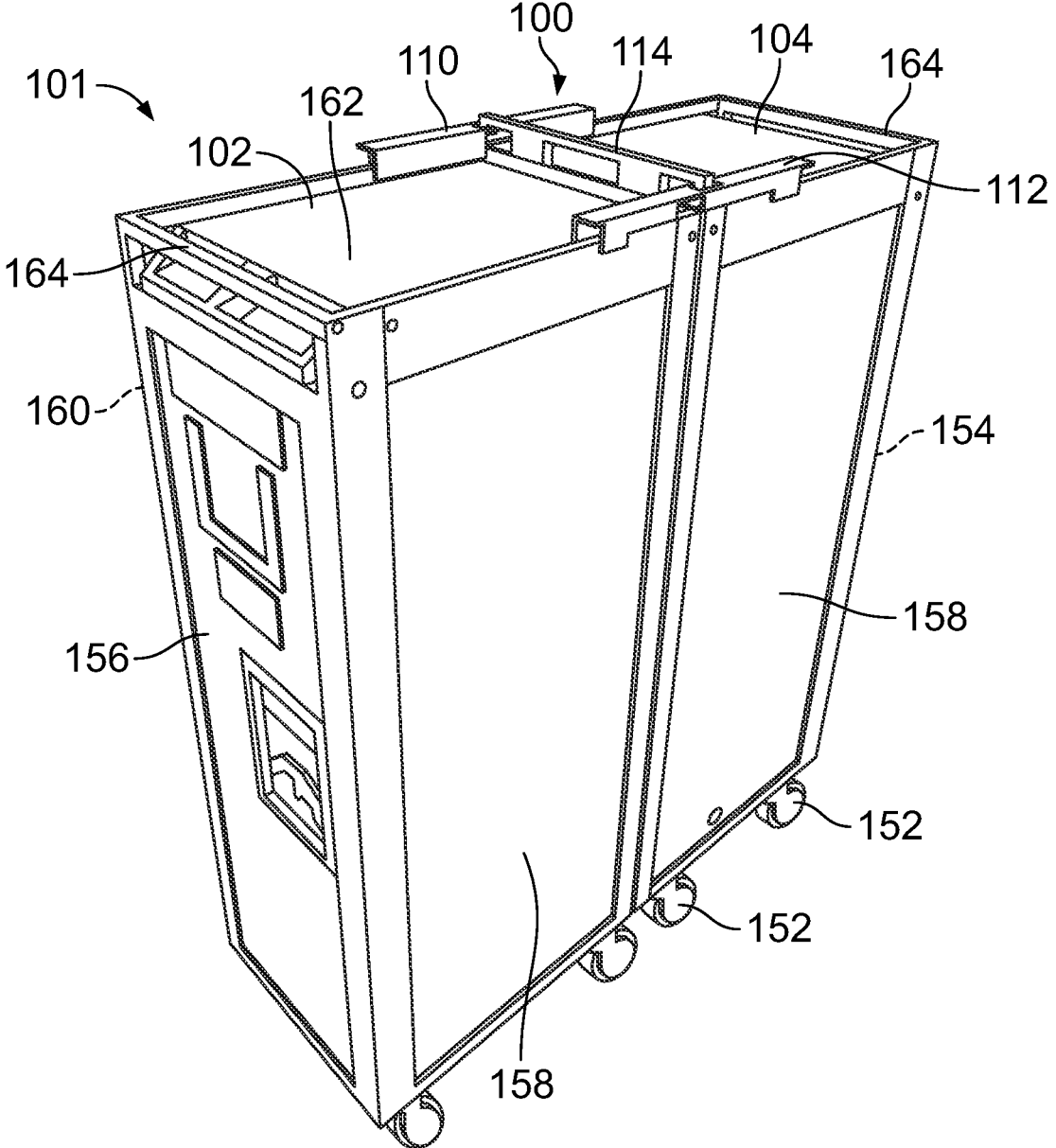
FIG. 2 illustrates a perspective view from a first end of the coupling system connecting the first cart to the second cart.

FIG. 1 illustrates a perspective view from a first side of a coupling system 100 connecting a first cart 102 to a second cart 104, according to an example of the present disclosure. FIG. 2 illustrates a perspective view from a first end of the coupling system 100 connecting the first cart 102 to the second cart 104. As shown a FIGS. 1 and 2, a system 101 includes the first cart 102, the second cart 104, and the coupling system 100. In at least one example, the first cart 102 and the second cart 104 are beverage carts. As another example, the first cart 102 and the second cart 104 are food carts. As another example, the first cart 102 and the second cart 104 are waste carts. As another example, the first cart 102 is a beverage cart, a food cart, or a waste cart, and the second cart 104 is any other of a beverage cart, a food cart, or a waste cart. Each of the first cart 102 and the second cart 104 can be a half-size cart or a full-size cart.

The coupling system 100 is configured to removably connect the first cart 102 to the second cart 104. That is, the coupling system 100 can be selectively disposed over and on portions of the first cart 102 and the second cart 104 to temporarily connect the first cart 102 to the second cart 104. The coupling system 100 can be removed from the first cart 102 and the second cart 104 (such as by lifting the coupling system 100 off the portions of the first cart 102 and the second cart 104) to disconnect and uncouple the first cart 102 from the second cart 104.

Each of the first cart 102 and the second cart 104 includes a base 150. One or more wheels 152 are movably secured to the base 150. End walls 154 and 156 and side walls 158 and 160 upwardly extend from the base 150. An upper counter 162 connects to the end walls 154, 156 and the side walls 158 and 160. A handle 164 can be disposed proximate to the upper counter 162. For example, the handle 164 can be located at an upper end of an end wall 154 or 160.

The base 150, the end walls 154, 156, and the side walls 158, 160 define one or more internal chambers therebetween. Various objects, such as food and beverage items, waste, and the like can be stored in the internal chamber(s).

Figure 3:
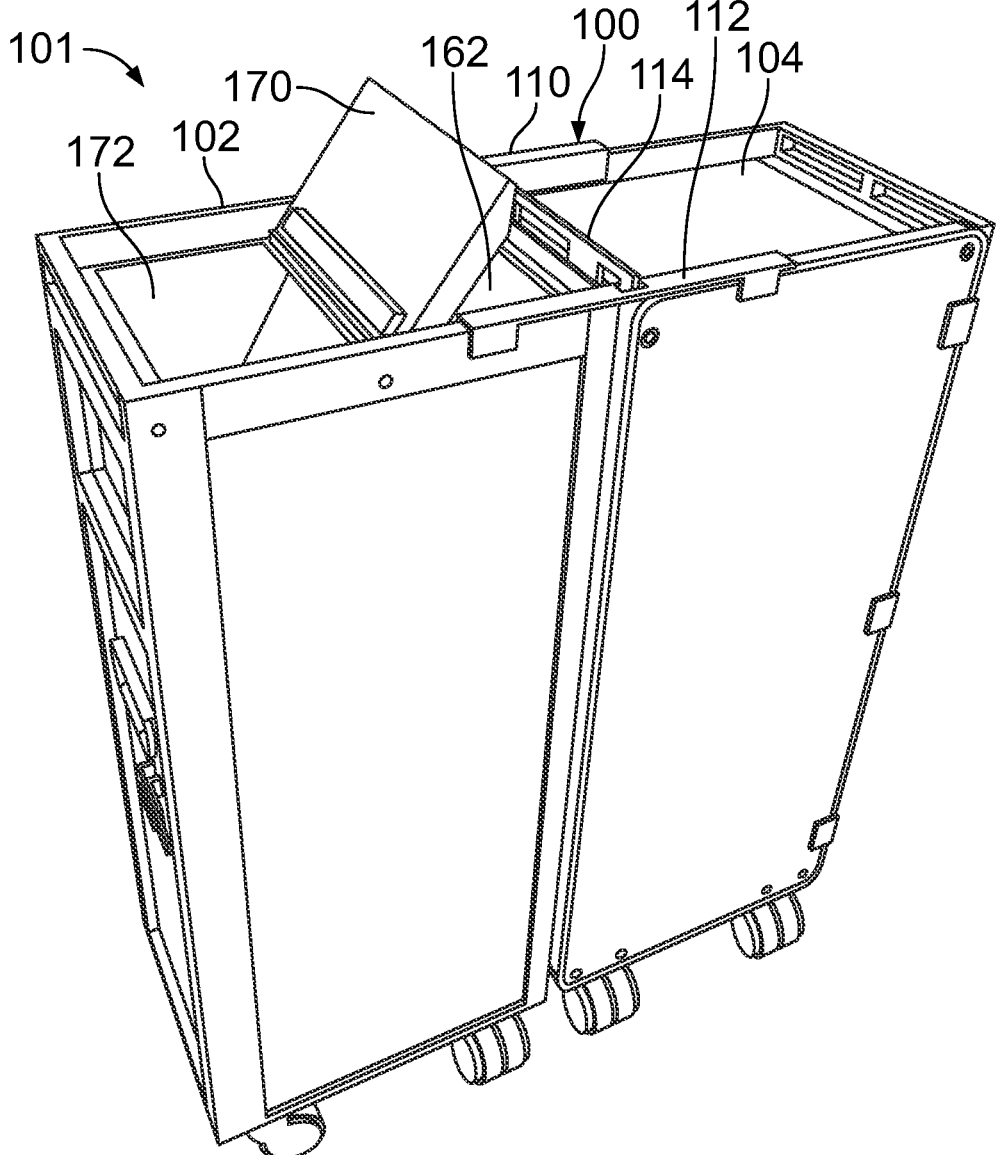
FIG. 3 illustrates a perspective view from a first side of a coupling system connecting a first cart to a second cart, according to an example of the present disclosure.

FIG. 3 illustrates a perspective view from a first side of the coupling system 100 connecting a first cart 102 to a second cart 104, according to an example of the present disclosure. In this example, the first cart 102 is a waste cart, and the second cart 104 is a beverage cart or a food cart. For example, a moveable door 170 can be coupled to the upper counter 162 of the first cart 102. The door 170 can be opened to expose a waste compartment 172.

Figure 4:
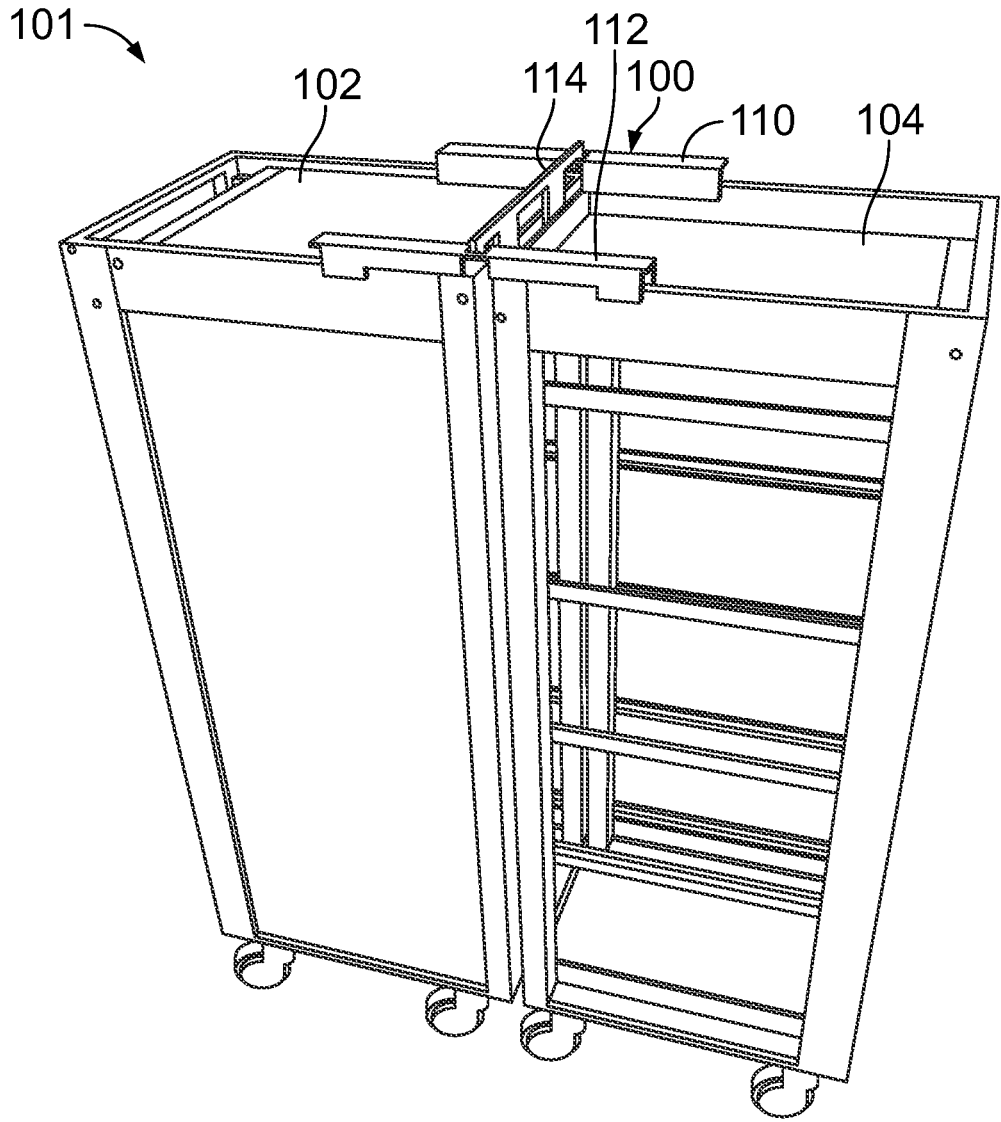
FIG. 4 illustrates a perspective view from a first side of a coupling system connecting a first cart to a second cart, according to an example of the present disclosure.

FIG. 4 illustrates a perspective view from a first side of the coupling system 100 connecting a first cart 102 to a second cart 104, according to an example of the present disclosure. In this example, the first cart 102 is a beverage cart, and the second cart 104 is a storage cart.

Figure 5:
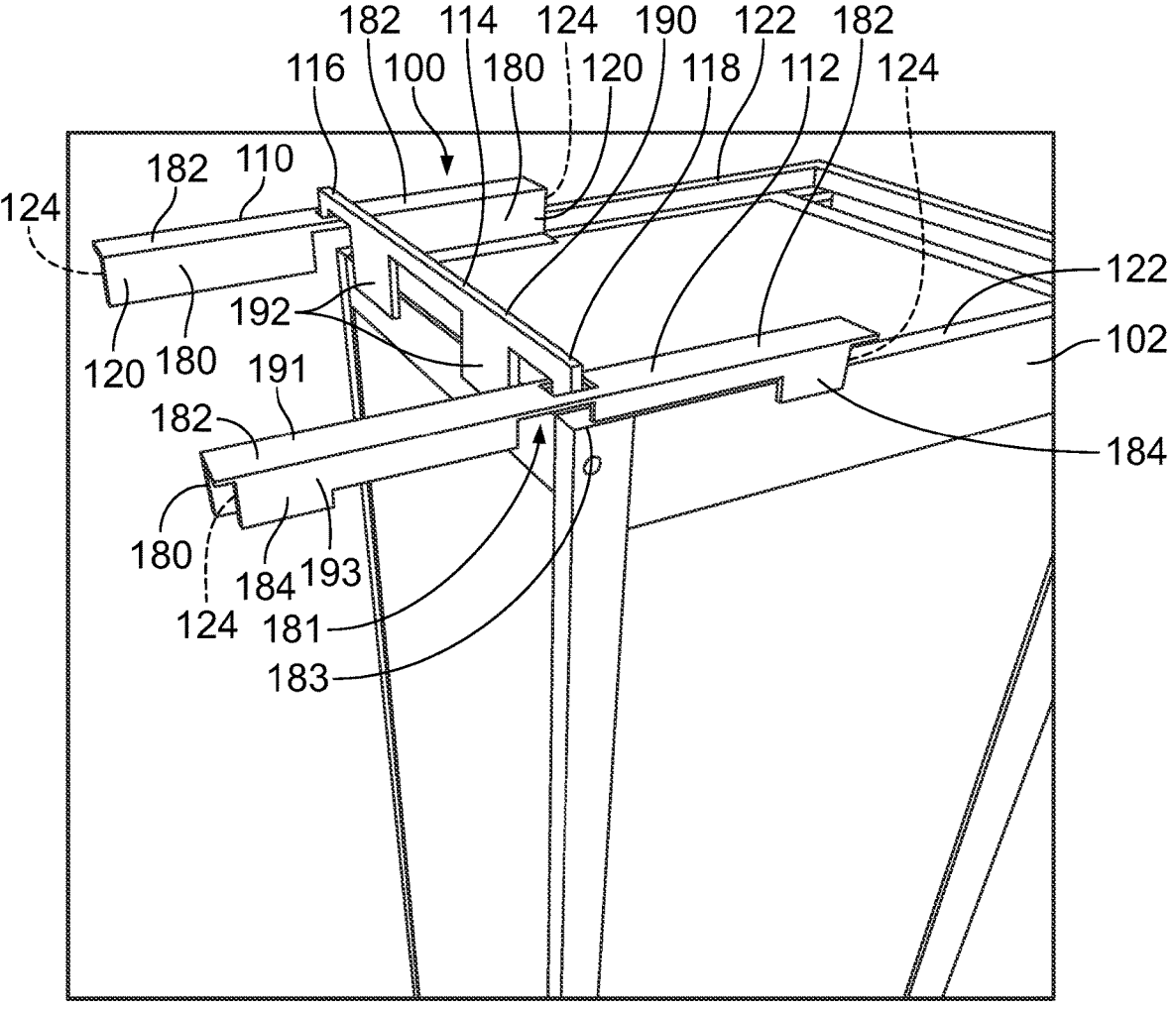
FIG. 5 illustrates a perspective view of a coupling system mounted to a cart, according to an example of the present disclosure.

FIG. 5 illustrates a perspective view of the coupling system 100 mounted to a cart 102, according to an example of the present disclosure. Referring to FIGS. 1-5, the coupling system includes a pair of stabilizing arms 110 (a first stabilizing arm) and 112 (a second stabilizing arm). The stabilizing arm 110 spans between the first cart 102 and the second cart 104 on a first side, and the stabilizing arm 112 spans between the first cart and the second cart 104 on a second side that is opposite from the first side.

In at least one example, the stabilizing arms 110 and 112 include one or more interior flanges 180 (for example, first flange(s)) having a first size (for example, a first length and height) that downwardly extend from a first side 191 of a ledge 182, which can be orthogonal to the interior flanges 180. One or more exterior flanges (such as having a second size differing from the first size, such as reduced lengths and/or heights) 184 (for example, second flange(s)) can downwardly extend from a second (opposite) side 193 of the ledge 182 opposite from the flange(s) 180. Optionally, the stabilizing arms 110 and 112 can include mirror image flanges extending from opposite sides of the ledge 182. For example, the flanges on either side can be full length. As another example, the flanges can be shorter tabs (such as the tabs 184) extending from opposite sides of the ledge 182. As an example, two or more flanges 184 can extend from a first side of the ledge 182, and two or more flanges 184 can extend from a second (opposite) side of the ledge 182.

As shown, the ledges 182 span between the first cart 102 and the second cart 104. A first flange 180 downwardly extends from the ledge 182 over the first cart 102, and a second flange 184 downwardly extends from the ledge 182 over the second cart 104. A gap 181 separates the first flange 180 from the second flange 184. Upper edges 183 of portions of walls of the first cart 102 and the second cart 104 are disposed within the gap 181.

Optionally, a single ledge 182 can span between the first cart 102 and the second cart 104. The ledge 182 can include a recessed portion in which the upper edges 183 are disposed.

In at least one example, the stabilizing arms 110 and 112 are connected together by a cart cross member 114 extending between and relative to the carts 102 and 104. The stabilizing arms 110 and 112 extend from opposing ends 116 and 118 of the cart cross member 114. Each stabilizing arm 110 and 112 includes the flanges 180 and 184 that extend downwardly to trap an upper side edge 122 of the joined carts 102 and 104. Each stabilizing arm 110 and 112 includes a central notch 124 defined between the flange(s) 180, the ledge(s) 182, and the flange(s) 184 that traps upper edges of the joined carts 102. Accordingly, the coupling system 100 can temporarily couple two carts 102 and 104 together for transport. A plurality of coupling systems 100 can be used to link together three or more carts in a linear array of carts for transport. In at least one example, the coupling system 100 does not include the cart cross member 114.

In at least one example, the cart cross member 114 includes a spanner bar 190 that couples to and extends between the stabilizing arms 110 and 112. The spanner bar 190 can be connected to upper surfaces of the stabilizing arms 110 and 112, such as upper surfaces of the ledges 182. Optionally, the spanner bar 190 can extend flush from the upper surfaces of the ledges 182. In at least one example, one or more spacer tabs 192 downwardly extend from the spanner bar 190. The cart cross member 114 is configured to be disposed above a separating and/or interface between end walls of the first cart 102 and the second cart 104. The spacer tabs 192 can be disposed between the portions of the end walls of the first cart 102 and the second cart 104. The spacer tabs 192 operate to form a barrier between the first cart 102 and the second cart 104, and are configured to exert moving force into the first cart 102 and the second cart 104, depending on whether the carts 102 and 104 are being pushed or pulled. Optionally, a single spacer tab 192 can extend from the spanner bar 190. As another example, three or more spacer tabs 192 can extend from the spanner bar 190. In at least one other example, the cart cross member 114 may not include any spacer tabs.

Figure 6:
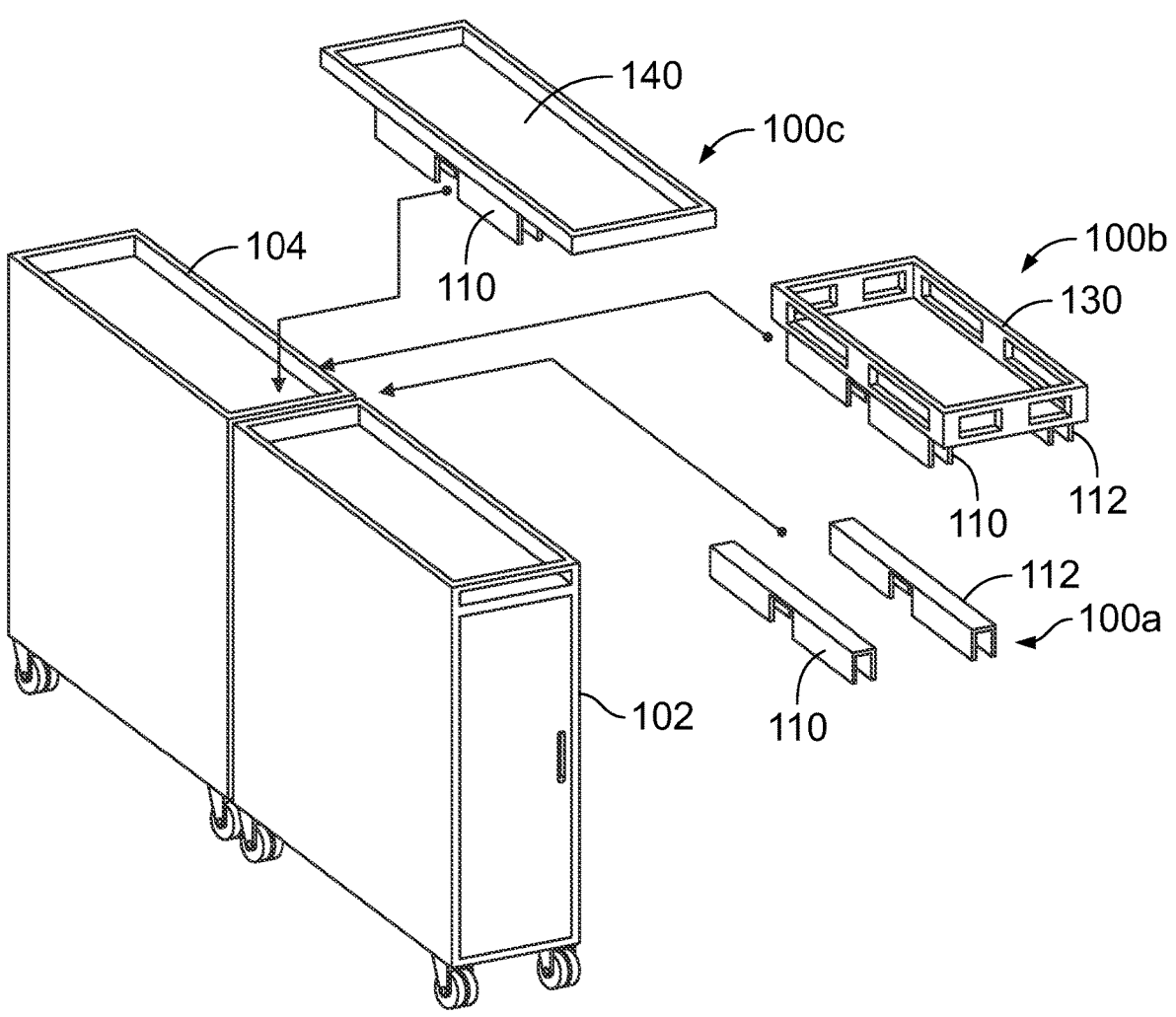
FIG. 6 illustrates a perspective view of coupling systems configured to connect a first cart to a second cart, according to an example of the present disclosure.

FIG. 6 illustrates a perspective view of coupling systems 100a, 100b, and 100c configured to connect a first cart 102 to a second cart 104, according to an example of the present disclosure. As an example, the coupling system 100a includes the two stabilizing arms 110 and 112 (but not a cart cross member). As an example, the coupling system 100b includes stabilizing arms 110 and 112 connected together by a basket 130. As an example, the coupling system 100c includes stabilizing arms 110 and 112 connected together by a countertop 140. As shown, the coupling system may or may not include a spanner bar. The stabilizing arms 110 and 112 may or may not be connected together. In at least one example, the stabilizing arms 110 and 112 can be connected together through an intermediate structure, such as a basket, a countertop, and/or the like.

Figure 7:
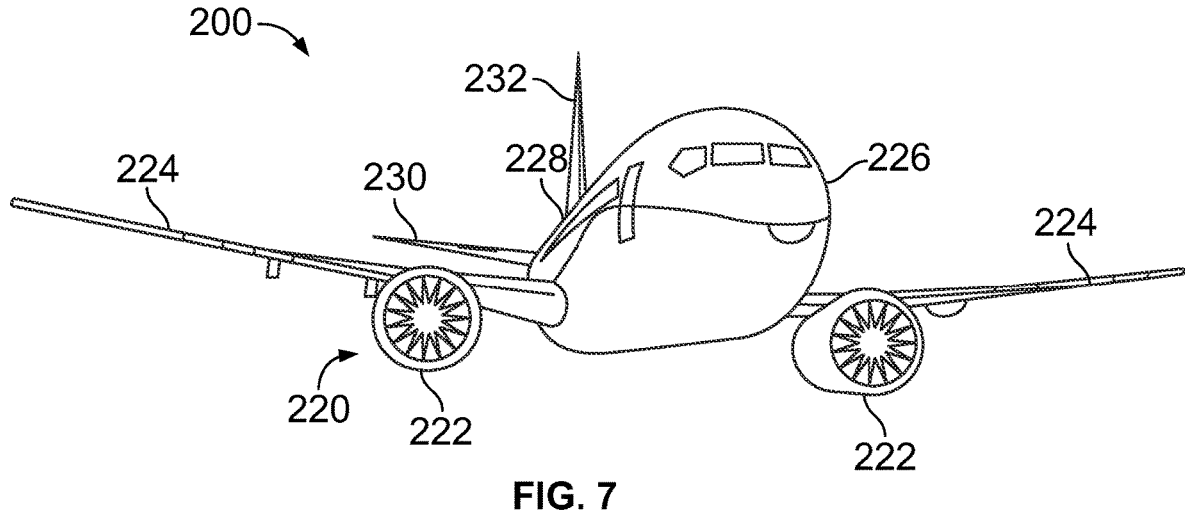
FIG. 7 illustrates a perspective front view of the aircraft, according to an example of the present disclosure.

FIG. 7 illustrates a perspective front view of an aircraft 200, according to an example of the present disclosure. The aircraft 200 includes a propulsion system 220 that includes engines 222, for example. Optionally, the propulsion system 220 may include more engines 222 than shown. The engines 222 are carried by wings 224 of the aircraft 200. In other embodiments, the engines 222 may be carried by a fuselage 226 and/or an empennage 228. The empennage 228 may also support horizontal stabilizers 230 and a vertical stabilizer 232. It is to be understood that the aircraft 200 can be sized, shaped, and configured differently than shown in FIG. 7.

As described herein, the coupling systems can be used in relation to carts within an internal cabin of a vehicle, such as a commercial aircraft (as shown in FIG. 7). The coupling systems can be used in relation to internal cabins of other vehicles, such as buses, train cars, watercraft, spacecraft, and/or the like. For example, the coupling systems can be used to link carts together, which can then be moved within the internal cabin. As another example, the coupling systems can be used to link half-size carts together, which can then be stowed in a galley compartment. The linked half-size carts can be easily removed from the galley compartment (instead of an inner most half cart remaining within the galley compartment, and requiring an individual to reach further into the galley compartment to remove). Also, linking carts together with coupling systems increases the efficiency of transporting, loading, and unloading processes, such as in relation to catering operations. Carts linked by the coupling systems can be more stable within a catering vehicle, for example. Carts linked by the coupling systems also improved the efficiency of gate-turn catering operations, such as at an airport. Examples of the present disclosure can also be used in food catering service, for example, whether or not in a vehicle. For example, catering service providers can manage the galley and waste carts (for example, cleaning them, preparing meals, stowing meals in the carts, and refrigerating prior to transporting carts to and from the airplane). The coupling systems can be useful during such operations. The coupling systems can be used with respect to galley and waste carts used within fixed structures, such as residential or commercial buildings.

Figure 8:
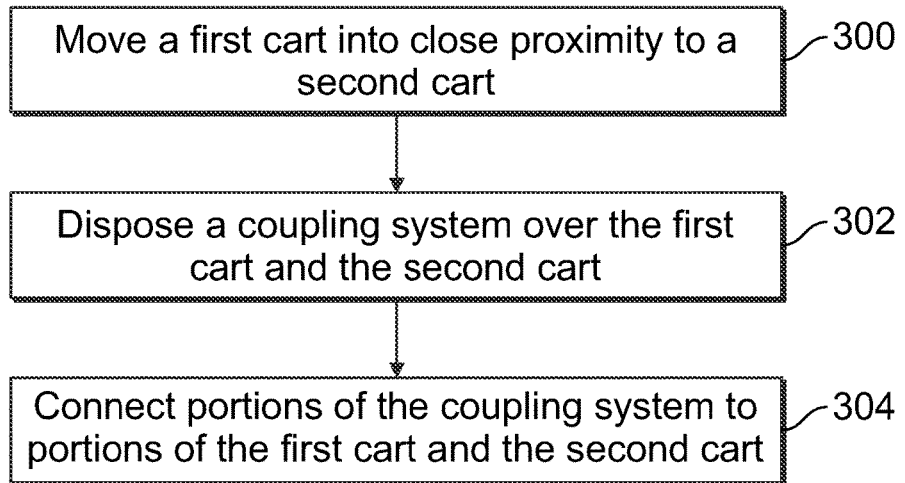
FIG. 8 illustrates a flow chart of a method of coupling a first cart to a second cart, according to an example of the present disclosure.

FIG. 8 illustrates a flow chart of a method of coupling a first cart to a second cart, according to an example of the present disclosure. At 300, a first cart is moved into close proximity to a second cart. For example, an end wall of the first cart can directly abut an end wall of the second cart. At 302, a coupling system (such as any of those described herein) is disposed over the first cart and the second cart. At 304, portions of the coupling system are connected to portions of the first cart and the second cart.

Further, the disclosure comprises examples according to the following clauses:

Clause 1. A coupling system for removably connecting a first cart to a second cart, the coupling system comprising:
    a first stabilizing arm configured to span between the first cart and the second cart on a first side; and
    a second stabilizing arm configured to span between the first cart and the second on a second side opposite from the first side.

Clause 2. The coupling system of Clause 1, further comprising a cart cross member configured to extend proximate to ends of the first cart and the second cart, wherein the cart cross member connects the first stabilizing arm to the second stabilizing arm.

Clause 3. The coupling system of Clause 2, wherein the cart cross member comprises:

a spanner bar connected to the first stabilizing arm and the second stabilizing arm; and one or more spacer tabs downwardly extending from the spanner bar.

Clause 4. The coupling system of any of Clauses 1-3, wherein each of the first stabilizing arm and the second stabilizing arm includes one or more flanges that extend downwardly to trap an upper side edge of each of the first cart and the second cart.

Clause 5. The coupling system of Clause 4, wherein the one or more flanges comprise:

one or more first flanges downwardly extending from a first side of a ledge; and one or more second flanges downwardly extending from a second side of the ledge, wherein the second side is opposite from the first side.

Clause 6. The coupling system of Clause 5, wherein the one or more first flanges have a first size, and wherein the one or more second flanges have a second size that differs from the first size.

Clause 7. The coupling system of any of Clauses 4-6, wherein each of the first stabilizing arm and the second stabilizing arm includes a central notch that traps upper edges of the first cart and the second cart.

Clause 8. The coupling system of any of Clauses 1-7, further comprising a basket that connects the first stabilizing arm to the second stabilizing arm.

Clause 9. The coupling system of any of Clauses 1-8, further comprising a countertop that connects the first stabilizing arm to the second stabilizing arm.

Clause 10. The coupling system of any of Clauses 1-9, wherein each of the first cart and the second cart is a half-size cart.

Clause 11. A method for removably connecting a first cart to a second cart, the method comprising:

connecting first cart to a second cart with a first stabilizing arm spanning between the first cart and the second cart on a first side, and a second stabilizing arm spanning between the first cart and the second on a second side opposite from the first side.

Clause 12. The method of Clause 11, further comprising connecting the first stabilizing arm to the second stabilizing arm with a cart cross member proximate to ends of the first cart and the second cart.

Clause 13. The method of Clauses 11 or 12, wherein said connecting comprises trapping upper edges of the first cart and the second cart within a central notch of each of the first stabilizing arm and the second stabilizing arm.

Clause 14. The method of any of Clauses 11-13, further comprising connecting the first stabilizing arm to the second stabilizing arm with a basket.

Clause 15. The method of any of Clauses 11-14, further comprising connecting the first stabilizing arm to the second stabilizing arm with a countertop.

Clause 16. The method of any of Clauses 11-15, wherein each of the first cart and the second cart is a half-size cart.

Clause 17. A system comprising:

a first cart;

a second cart; and a coupling system that removably connects the first cart to the second cart, the coupling system comprising:

a first stabilizing arm spanning between the first cart and the second cart on a first side; and a second stabilizing arm spanning between the first cart and the second on a second side opposite from the first side.

Clause 18. The system of Clause 17, wherein the coupling system further comprises a cart cross member proximate to ends of the first cart and the second cart, wherein the cart cross member connects the first stabilizing arm to the second stabilizing arm.

Clause 19. The system of Clauses 17 or 18, wherein the coupling system further comprises one or both of a countertop or a basket that connects the first stabilizing arm to the second stabilizing arm.

Clause 20. The system of any of Clauses 17-19, wherein each of the first cart and the second cart is one or more of a meal cart, a beverage cart, or a waste cart, and wherein each of the first cart and the second cart is a half-size cart.

As described herein, examples of the present disclosure provide systems and methods that reduce workload of flight attendants during a flight. Further, examples of the present disclosure increase stability of certain carts, such as half-size carts.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A coupling system for removably connecting a first cart to a second cart, the coupling system comprising:
   a first stabilizing arm configured to span between the first cart and the second cart on a first side, the first stabilizing arm including a first aperture;
   a second stabilizing arm configured to span between the first cart and the second on a second side opposite from the first side, the second stabilizing arm including a second aperture;
   wherein each of the first stabilizing arm and the second stabilizing arm includes one or more flanges that extend downwardly to trap an outer upper side edge of each of the first cart and the second cart; and
   a cross member connecting the first stabilizing arm and the second stabilizing arm and including a first end and an opposing second end, the first end having a first downwardly extending tab extending into the first aperture of the first stabilizing arm, the second end having a second downwardly extending tab extending into the second aperture of the second stabilizing arm.

2. The coupling system of claim 1, wherein the cross member is configured to extend proximate to ends of the first cart and the second cart.

3. The coupling system of claim 2, wherein the cart cross member comprises:
   a spanner bar connected to the first stabilizing arm and the second stabilizing arm.

4. The coupling system of claim 1, wherein the one or more flanges comprise:
   one or more first flanges downwardly extending from a first side of a ledge; and
   one or more second flanges downwardly extending from a second side of the ledge, wherein the second side is opposite from the first side.

5. The coupling system of claim 4, wherein the one or more first flanges have a first size, and wherein the one or more second flanges have a second size that differs from the first size.

6. The coupling system of claim 1, wherein each of the first stabilizing arm and the second stabilizing arm includes a central notch that traps upper edges of the first cart and the second cart.

7. The coupling system of claim 1, further comprising a basket that connects the first stabilizing arm to the second stabilizing arm.

8. The coupling system of claim 1, further comprising a countertop that connects the first stabilizing arm to the second stabilizing arm.

9. The coupling system of claim 1, wherein each of the first cart and the second cart has a first length that is half a second length of another cart.

10. A method for removably connecting a first cart to a second cart, the method comprising:
   connecting a first cart having one or more wheels to a second cart having one or more wheels with a first stabilizing arm spanning between the first cart and the second cart on a first side, and a second stabilizing arm spanning between the first cart and the second on a second side opposite from the first side;
   wherein when connecting the first cart to the second cart, trapping an outer upper side edge of each of the first cart and second cart with one or more flanges of the first stabilizing arm and the second stabilizing arm that extend downwardly;
   connecting the first stabilizing arm to the second stabilizing arm with a cross member, the cross member including a first end and an opposing second end, the first end having a first downwardly extending tab extending into a first aperture of the first stabilizing arm, the second end having a second downwardly extending tab extending into a second aperture of the second stabilizing arm.

11. The method of claim 10, wherein the cross member is connected proximate to ends of the first cart and the second cart.

12. The method of claim 10, wherein said connecting comprises trapping upper edges of the first cart and the second cart within a central notch of each of the first stabilizing arm and the second stabilizing arm.

13. The method of claim 10, further comprising connecting the first stabilizing arm to the second stabilizing arm with a basket.

14. The method of claim 10, further comprising connecting the first stabilizing arm to the second stabilizing arm with a countertop.

15. The method of claim 10, wherein each of the first cart and the second cart has a first length that is half a second length of another cart.

16. A system comprising:
   a first cart having one or more wheels;
   a second cart having one or more wheels; and
   a coupling system that removably connects the first cart to the second cart, the coupling system comprising:
      a first stabilizing arm spanning between the first cart and the second cart on a first side, the first stabilizing arm including a first aperture;
      a second stabilizing arm spanning between the first cart and the second on a second side opposite from the first side, the second stabilizing arm including a second aperture;
   wherein each of the first stabilizing arm and the second stabilizing arm includes one or more flanges that extend downwardly to trap an outer upper side edge of each of the first cart and the second cart; and
   a cross member connecting the first stabilizing arm and the second stabilizing arm and including a first end and an opposing second end, the first end having a first downwardly extending tab extending into the first aperture of the first stabilizing arm, the second end having a second downwardly extending tab extending into the second aperture of the second stabilizing arm.

17. The system of claim 16, wherein the cross member is proximate to ends of the first cart and the second cart.

18. The system of claim 16, wherein the coupling system further comprises one or both of a countertop or a basket that connects the first stabilizing arm to the second stabilizing arm.

19. The system of claim 16, wherein each of the first cart and the second cart is one or more of a meal cart, a beverage cart, or a waste cart, and wherein each of the first cart and the second cart has a first length that is half a second length of another cart.

20. The coupling system of claim 3, wherein when the coupling system couples the first cart to the second cart the one or more spacer tabs are configured to engage the first cart or the second cart to exert a moving force on the first cart or the second cart.

\* \* \* \* \*